United States Patent
Benaloh et al.

(10) Patent No.: US 8,239,927 B2
(45) Date of Patent: Aug. 7, 2012

(54) AUTHENTICATION TICKET VALIDATION (75) Inventors: Josh D. Benaloh, Redmond, WA (US);
Ismail Cem Paya, New York, NY (US)

(73) Assignee: Microsoft Corporation, Redmond, WA (US)

( * ) Notice: Subject to any disclaimer, the term of this patent is extended or adjusted under 35 U.S.C. 154(b) by 1196 days.

(21) Appl. No.: 12/040,357

(22) Filed: Feb. 29, 2008

(65) Prior Publication Data

US 2009/0222900 A1    Sep. 3, 2009

(51) Int. Cl.
    *H04L 29/06* (2006.01)
(52) U.S. Cl. .................. 726/9; 726/10; 726/2; 713/150
(58) Field of Classification Search ................. 726/9, 10
See application file for complete search history.

(56) References Cited

U.S. PATENT DOCUMENTS

| | | | |
|---|---|---|---|
| 6,055,316 A * | 4/2000 | Perlman et al. | 380/262 |
| 6,105,012 A | 8/2000 | Chang | |
| 6,351,812 B1 | 2/2002 | Datar | |
| 6,587,867 B1 * | 7/2003 | Miller et al. | 709/200 |
| 7,039,946 B1 | 5/2006 | Binding | |
| 7,093,129 B1 | 8/2006 | Gavagni | |
| 7,191,467 B1 | 3/2007 | Dujari | |
| 7,240,192 B1 | 7/2007 | Paya | |
| 2003/0061512 A1 | 3/2003 | Flurry | |
| 2003/0135734 A1 | 7/2003 | Fagan | |
| 2003/0172270 A1 * | 9/2003 | Newcombe et al. | 713/168 |
| 2003/0177351 A1 | 9/2003 | Skingle | |
| 2003/0204732 A1 | 10/2003 | Audebert | |
| 2003/0217288 A1 * | 11/2003 | Guo et al. | 713/201 |
| 2004/0088260 A1 | 5/2004 | Foster | |
| 2004/0230825 A1 | 11/2004 | Shepherd | |
| 2004/0250066 A1 | 12/2004 | Di Luoffo | |
| 2005/0144452 A1 | 6/2005 | Lynch | |
| 2005/0193093 A1 | 9/2005 | Ashvin | |
| 2005/0204041 A1 | 9/2005 | Blinn | |
| 2006/0200855 A1 * | 9/2006 | Willis | 726/2 |
| 2007/0027818 A1 | 2/2007 | Lofgren | |

OTHER PUBLICATIONS

Toni Nykanen, Secure Cross-Platform Single Sign-On Solution for the World-Wide Web, Master's thesis, May 27, 2002, Helsinki University of Technology, Department of Computer Science and Engineering, http://users.tkk.fi/~tpnykane/thesis/tpnykane_2002.pdf.

(Continued)

*Primary Examiner* — Kim Vu
*Assistant Examiner* — Yogesh Paliwal
(74) *Attorney, Agent, or Firm* — Shook, Hardy & Bacon L.L.P.

(57) ABSTRACT

Computer-readable media, systems, and methods for validating an authentication ticket to ensure authenticated communications between a client and an online service provider. In embodiments an authentication request is received from a user agent associated with the client and the authentication request includes a set of identification information and a set of authentication information. Additionally, it is determined that the set of identification information and the set of authentication information are associated with a user and an authentication ticket is created including a user identification and an authentication, indicating to the online service provider that the user is authenticated to access one or more online services. Further, a validation token is embedded into the authentication ticket that provides enhanced verification that the access provided by the online service provider is authenticated.

12 Claims, 5 Drawing Sheets

OTHER PUBLICATIONS

The UA NetID WebAuth Service: An Introduction, Adapted for the UA NetID WebAuth project by Gary Windham, University of Arizona, Center for Computing and Information Technology, last updated Oct. 20, 2005, http://netid.ccit.arizona.edu/apidocs/webauth/index.html.

David Orrell, Scoping Next Generation Athens Services, Eduserv Athens, Eduserv Technologies Ltd., 2004, http://www.athensams.net/upload/athens/pdf/athens_ng_scoping_1.0.pdf.

R. Schemers and R. Allbery, WebAuth V3 Technical Specification, Stanford University, Jan. 2006, http://webauth.stanford.edu/protocol.html.

Davey Winder, "Free Webmail Crypto Browser Extension for Firefox," Sep. 8, 2006, 3 pages, http://www.daniweb.com/blogs/entry 860.html.

Birgit Pfitzmann and Michael Waidner, IBM Zurich Research Lab, "Privacy in Browser-Based Attribute Exchange," 2002, 11 pages, http://www.zurich.ibm.com/security/publications/2002/PfiWai2002bBBAE-privacy-WPES.pdf.

Pwdhash, "Browser Extension for Secure Passwords," Oct. 19, 2007, pp. 1-3, http://www.security-hacks.com/2007/04/27/pwdhash-browser-extension-for-secure-passwords.

Kent Cearley and Lindsay Winsor, University of Colorado System Office, Boulder, Colorado, "Securing IT Resources with Digital Certificates and LDAP," pp. 1-12, Oct. 19, 2007, http://www.educause.edu/ir/library/html/cnc9707/cnc9707.html.

* cited by examiner

AUTHENTICATION TICKET VALIDATION

BACKGROUND

Online services often involve the communication of sensitive material between the user agent associated with a client computer and the online service provider. Users typically prefer, and sometimes demand, hostile parties not have access to the communicated information. Identification and authentication mechanisms are used to ensure authenticated access, providing security for the sensitive information. But where an authentication ticket is misappropriated, or stolen, by a hostile party, the hostile party may obtain access by presenting the authentication ticket to the online service provider. Unfortunately, there is no way to ensure the party presenting an authentication ticket is, in fact, an authenticated party instead of a hostile party.

SUMMARY

Embodiments of the present invention provide computer-readable media, systems, and methods for validating an authentication ticket to ensure authenticated communications between a client and an online service provider. In embodiments, an authentication request is received from a user agent associated with the client and the authentication request includes a set of identification information and a set of authentication information. Also, it is determined that the set of identification information and the set of authentication information are associated with a user and an authentication ticket is created including a user identification and an authentication, indicating to the online service provider that the user is authenticated to access one or more services provided by the online service provider. Further, a validation token is embedded into the authentication ticket and the validation token provides enhanced verification that the access provided by the online service provider to the user is authenticated.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of the patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of the individual steps is explicitly described.

Embodiments of the present invention provide computer-readable media, systems, and methods for authentication ticket validation. In embodiments, an authentication request is received from a user agent associated with the client and the authentication request includes a set of identification information and a set of authentication information. Also, it is determined that the set of identification information and the set of authentication information are associated with a user and an authentication ticket is created including a user identification and an authentication, indicating to the online service provider that the user is authenticated to access one or more services provided by the online service provider. Further, a validation token is embedded into the authentication ticket and the validation token provides enhanced verification that the access provided by the online service provider to the user is authenticated. As used herein the phrases "online service(s)" and "online service provider(s)" are intended to include various types of online services. For instance, online services may include email, e-commerce, online banking, online social networking, personalized web services, etc. Thus, as will be understood and appreciated by those having skill in the art, it is contemplated and within the scope of the present invention that online services include various online services requiring user identification and authentication.

Accordingly, in one aspect, the present invention is directed to one or more computer-readable media having computer-usable instructions embodied thereon for performing a method of validating an authentication ticket to ensure authenticated communications between a client and an online service provider. The method includes receiving an authentication request from a user agent associated with the client and the authentication request includes a set of identification information and a set of authentication information. Further, the method includes creating an authentication ticket including a user identification and an authentication, indicating to the online service provider that the user is authenticated to access one or more services provided by the online service provider and embedding a validation token into the authentication ticket. In this aspect, the validation token provides enhanced verification that the access provided by the online service provider to the one or more services is authenticated.

In another aspect, the present invention is directed to a computerized system for validating an authentication ticket to ensure authenticated communications between a client and an online service provider. In this aspect, the system includes a receiving component configured to receive an authentication request from a user agent associated with the client. The authentication request including a set of identification information and a set of authentication information. The system further includes a determining component configured to determine that the set of identification information and the set of authentication information are associated with a user and a creating component configured to create the authentication ticket including a user identification and an authentication. The authentication ticket indicating to the online service provider that the user is authenticated to access one or more services provided by the online service provider. Further, the system includes an embedding component configured to embed a validation token into the authentication ticket, the validation token provides enhanced verification that the access provided by the online service provider to the one or more services is authenticated and a database for storing information associated with validating the authentication ticket.

In yet another aspect, the present invention is directed to a method for validating an authentication ticket to ensure authenticated communications between a client and an online service provider. The method includes receiving an authentication request from a user agent associated with the client. In this aspect, the authentication request includes a set of identification information and a set of authentication information. The method further includes determining that the set of identification information and the set of authentication information are associated with a user and creating the authentication ticket including a user identification and an authentication, indicating to the online service provider that the user is authenticated to access one or more services provided by the online service provider. Further, the method includes embedding a validation token into the authentication ticket. The validation token provides, in this aspect, enhanced verification that the access provided by the online service provider to the one or more services is authenticated. Still further the method includes sending the authentication ticket to the user agent. In this aspect, the user agent utilizes the authentication ticket to allow the user to gain access to the one or more services and the validation token is an IP address associated with the client. Also, in this aspect, the online service provider ensures an authenticated connection with the client, granting access to one or more online services where the online service provider determines that the IP address from the validation token matches an IP address associated with the client seeking access to the one or more online services.

Having briefly described an overview of embodiments of the present invention, an exemplary operating environment is described below.

Figure 1:
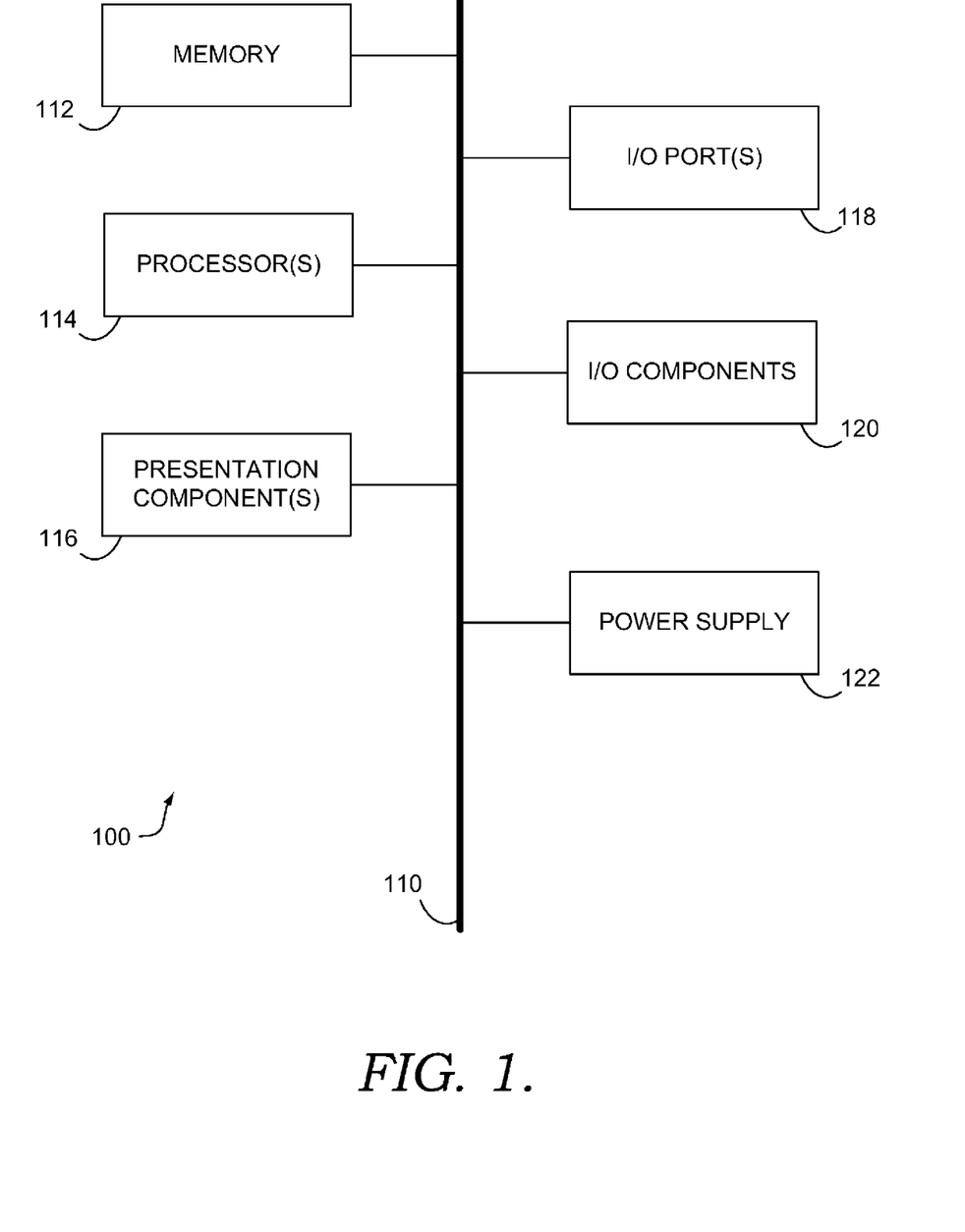
FIG. 1 is a block diagram of an exemplary computing system environment suitable for use in implementing the present invention.

Referring to the drawing figures in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the present invention may be described in the general context of computer code or machine-usable instructions, including computer-executable instructions such as program modules, being executed by a computer or other machine, such as a personal data assistant or other handheld device. The phrase "computer-usable instructions" may be used herein to include the computer code and machine-usable instructions. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer usable instructions form an interface to allow a computer to react according to a source of input. The instructions cooperate with other code segments to initiate a variety of tasks in response to data received in conjunction with the source of the received data.

Computing device 100 includes a bus 110 that directly or indirectly couples the following elements: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD), or other optical or holographic media; magnetic cassettes, magnetic tape, magnetic disk storage, or other magnetic storage devices; or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid state memory, hard drives, optical disc drives, and the like. Computing device 100 includes one or more processors that read from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
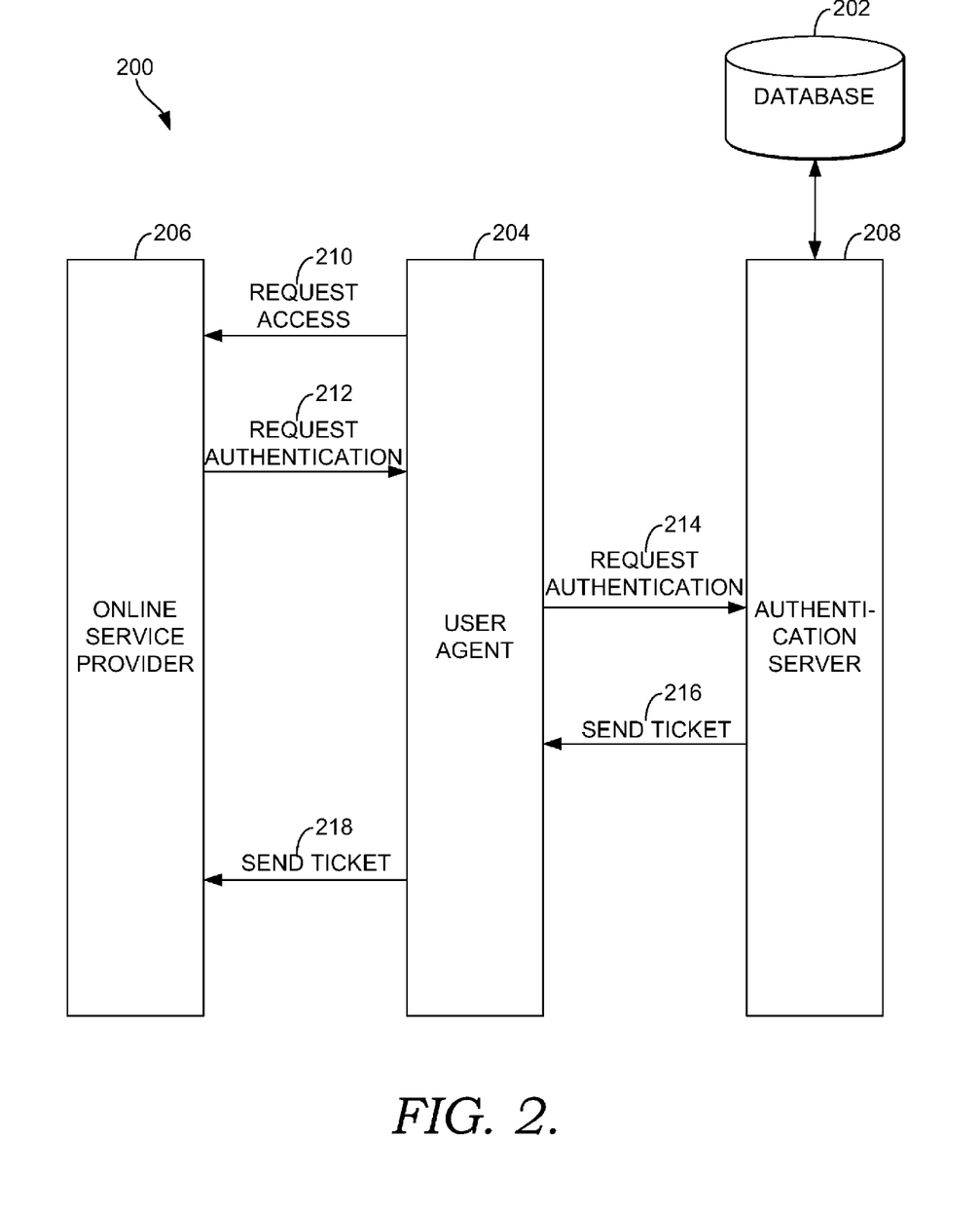
FIG. 2 is a block diagram illustrating an exemplary environment for authentication ticket validation, in accordance with an embodiment of the present invention.

Turning now to FIG. 2, a block diagram is provided illustrating an exemplary environment 200 for authentication ticket validation, in accordance with an embodiment of the present invention. The environment 200 includes a database 202, a user agent 204, an online service provider 206, and an authentication server 208 in communication with one another. For instance, database 202, user agent 204, online service provider 206, and authentication server 208 may be in communication using a network that may include, without limitation, one or more local area networks (LANs), wide area networks (WANs), and/or the Internet. Such networking environments are commonplace in offices, enterprise-wide computer networks and the Internet. Accordingly, specific features of the network are not further described herein.

Database 202 is configured to store information associated with authentication ticket validation. In various embodiments, without limitation, such information may include authentication information such as the identity and authentication for a user. For instance, the identity and authentication may be a username and a password for a user. In various embodiments, database 202 is configured to be searchable so that authentication server 208 may retrieve identity and authentication information for a user to confirm authentication of the user with an online service provider. Database 202 may be configurable and may include various information relevant to authentication ticket validation. The content and/or volume of such information are not intended to limit the scope of embodiments of the present invention in any way. Further, although illustrated as a single, independent component, database 202 may, in fact, be a plurality of databases, for instance, a database cluster, portions of which may reside on a computing device associated with user agent 204, online service provider 206, authentication server 208, on another external computing device, or any combination thereof. Still further, although illustrated as independent from authentication server 208, in various embodiments, the entirety of database 202 may reside on a computing device associated with authentication server 208.

Figure 3:
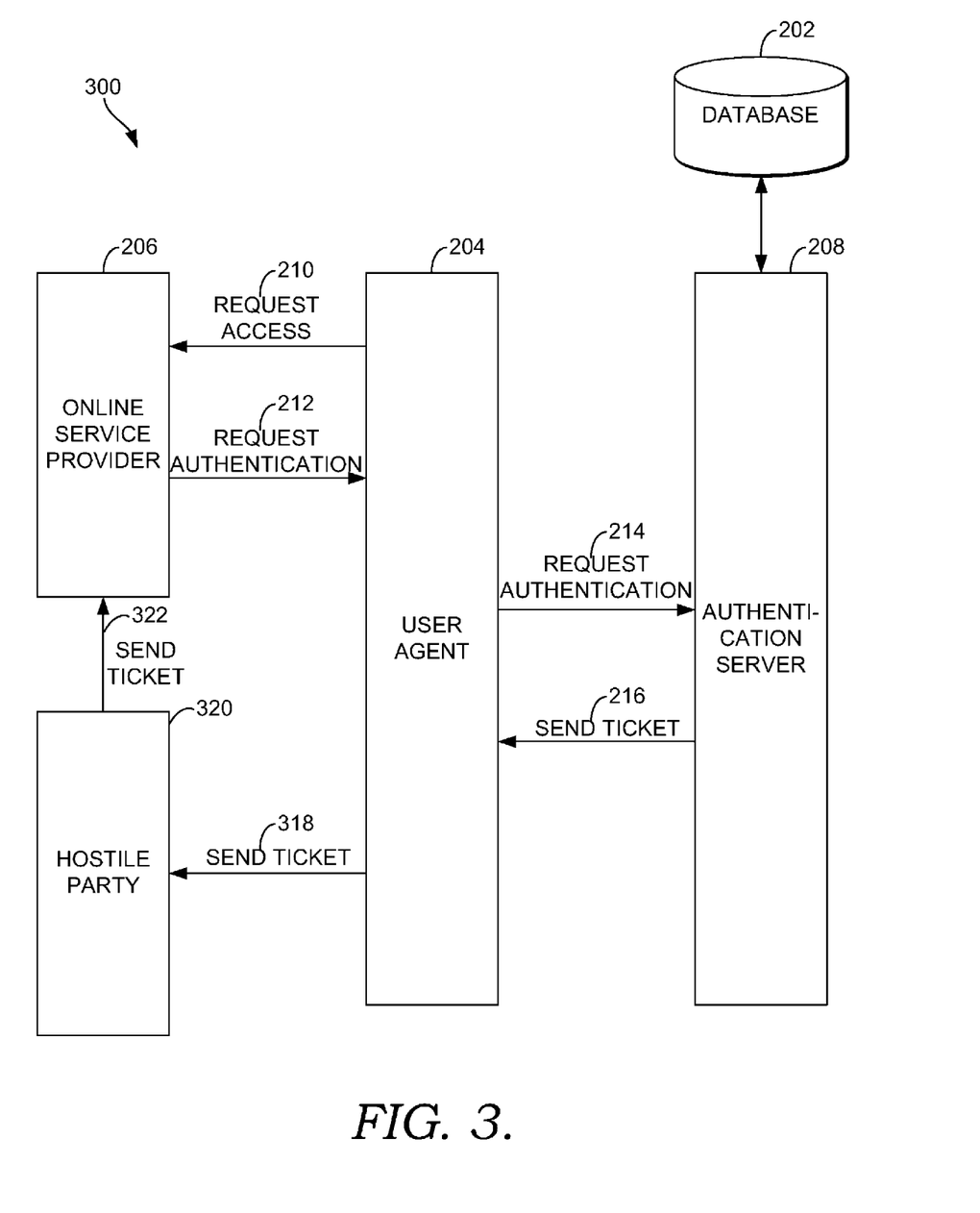
FIG. 3 is a block diagram illustrating an exemplary environment for authentication ticket validation, the system illustrating the effect of a misguided authentication ticket, in accordance with an embodiment of the present invention.

Before engaging in a discussion of the details of authentication ticket validation, an exemplary overview discussion of authentication tickets, including misdirected authentication tickets, will be presented referencing FIGS. 2 and 3 to help illustrate the overall functionality of environment 200 in various embodiments. Accordingly, in embodiments, where a user is accessing a network with user agent 204, such as a web browser, and where a user attempts to access an online service operated by an online service provider, such as online service provider 206, user agent 204 may send a request to online service provider 206. Examples discussed herein refer to a user attempting to access a single online service offered by an online service provider. Embodiments of the present invention, however, contemplate that one authenticated access may allow a user to visit various online services without requiring more than one authentication. For instance, a user may log into an online account and have access to more than one service, such as email and a social networking site, associated with the online service provider. Thus, embodiments of the present invention are not limited to the exemplary embodiments discussing a single access point to a single service because it is contemplated that a single access point may be used for multiple online services. Referring back to FIG. 2, and assuming that the online service requested by the user is email, an access request will be sent to the email provider as illustrated by numeral 210. The request may include a set of identification information and a set of authentication information, such as a username and password, that the user is required to submit to access the email account.

As illustrated at numerals 212 and 214, in embodiments, the online service provider of the email service may not perform an authentication internally and may thus request authentication from an authentication server, such as authentication server 208, through user agent 204. In embodiments, the user may not recognize that the online service provider has requested authentication through the user agent to an authentication server. For instance, where the user agent is a web browser, the user may just see a login screen to the user's email account. Having entered a username and password, the user may not recognize that the web browser is requesting authentication from an authentication server. The authentication server, upon receiving an authentication request, may create a ticket to send to the online service provider (through the user agent as illustrated at numerals 216 and 218) confirming that the identification information and the authentication information entered by the user are associated and that the user should be granted access by the online service provider to one or more online services. For instance, referring to the email example, the authentication server will confirm that the address and password entered by the user are associated and, if so, the authentication server will create a ticket and send the ticket to the email provider instructing the email provider to grant access to the user. The user may then access his email.

As illustrated in FIG. 3, however, the ticket authenticating the user's access may not always be directed to the online service provider. Stated differently, when authentication server 208 creates and sends the ticket, the authentication server sends the ticket to a return URL address (the return URL address indicating to the authentication server a target to which the authentication server is to return the ticket). In some instances, due to hacking or other error, the ticket may be sent to a target that is not the online service provider. As illustrated at numeral 318 in FIG. 3, the ticket may be forwarded accidentally to a hostile party, such as hostile party 320. In those instances, hostile party 320 may then access the user's email or other account with the authentication ticket. In other words, because the ticket tells the online service provider to allow access to the party presenting the ticket, where a ticket is forwarded to a hostile party, that hostile party may present the ticket to the online service provider, as illustrated at numeral 322, and the online service provider may allow the hostile party to access one or more online services associated with the user. Those having ordinary skill in the art will understand and appreciate that tickets can be misdirected and, thus, the typical direction and misdirection of tickets will not be discussed in more detail herein. Instead, embodiments of the present invention are directed to preventing a hostile party from using a ticket once the ticket has been obtained by the hostile party, regardless of how the hostile party obtained the ticket (e.g., by accident or intentional hacking of the system).

Having provided an overview of discussion of environments in which authentication tickets are used and, occasionally, misdirected to hostile parties, an exemplary system for authentication ticket validation, in accordance with embodiments of the present invention, will now be discussed. In that regard, turning now to FIG. 4, a block diagram is provided illustrating an exemplary system 400 for authentication ticket validation, in accordance with an embodiment of the present invention. The system 400 includes a database 402 and an authentication server 404. Database 402 is similar to database 202 discussed with reference to FIGS. 2 and 3 and, thus, database 402 is configured to store information associated with authentication ticket validation. In various embodiments, without limitation, such information may include authentication information such as the identity and authentication for a user. For instance, the identity and authentication may be a username and a password for a user. In various embodiments, database 402 is configured to be searchable so that authentication server 404 may retrieve identity and authentication information for a user to confirm authentication of the user with an online service provider. Database 402 may be configurable and may include various information relevant to authentication ticket validation. The content and/or volume of such information are not intended to limit the scope of embodiments of the present invention in any way. Further, although illustrated as a single, independent component, database 402 may, in fact, be a plurality of databases, for instance, a database cluster, portions of which may reside on authentication server 404, on another external computing device, or any combination thereof. Still further, although illustrated as independent from authentication server 404, in various embodiments, the entirety of database 402 may reside on a computing device associated with authentication server 404.

Figure 4:
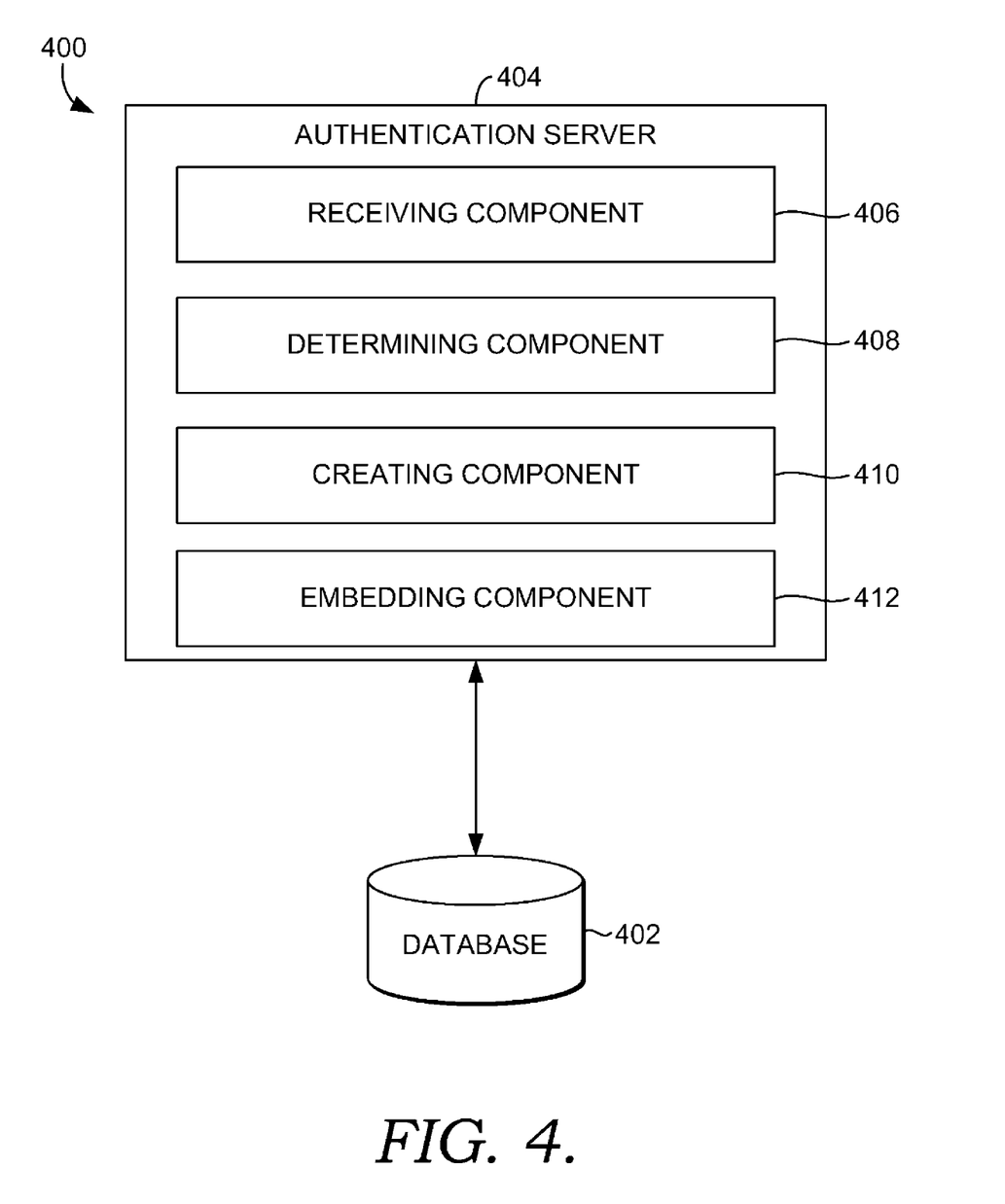
FIG. 4 is a block diagram illustrating an exemplary system for authentication ticket validation, in accordance with an embodiment of the present invention.

Authentication server 404 includes a receiving component 406, a determining component 408, a creating component 410, and an embedding component 412. Receiving component 406 is configured to receive an authentication request from a user agent associated with a client (such as computing device 100 of FIG. 1). As previously discussed the user agent may, in various embodiments, be a web browser associated with the client. In embodiments, the authentication request may include a set of identification information and a set of authentication information. For instance, in embodiments, the identification and authentication information may be a username and password. Embodiments of the present invention, however, are not limited to only a username and password. For instance, in embodiments, an account number or some other number associated with the user may be used as identification information. Also, various authentication information may be used including, but not limited to, a fingerprint or an answer to a prompted question. Each of these types of identification and authentication information, and others, are contemplated and within the scope of the present invention.

Determining component 408 is configured to determine that the set of identification information and the set of authentication information are associated with a user. For instance, in embodiments, determining component 408 may compare the identification information with a table of identification information stored, by way of example, on database 402. Upon finding a matching set of identification information, determining component 408 may compare stored authentication information with the authentication information received in the authentication request. Where there is matching information, determining component 408 may determine that the information provided in the authentication request is associated with the user and that the user is suitably authenticated. Stated differently, determining component 408 may, in embodiments, determine that the user should be granted access to the online services the user is requesting.

Creating component 410 is configured to create the authentication ticket including a user identification and an authentication. The authentication ticket indicates to the online service provider that the user is authenticated to access one or more services provided by the online service provider. Stated differently, upon requesting and receiving an authentication ticket, an online service provider may grant access to a user seeking admission into one or more online services. In various embodiments, the authentication ticket is encoded with a time stamp, tamper-proofing mechanisms, and various other information provided by the authentication server.

Embedding component 412 is configured to embed a validation token into the authentication ticket. In embodiments, the validation token provides enhanced verification that the access provided by the online service provider to the one or more services is authenticated. For instance, in various embodiments, the validation token ensures that even where the authentication ticket is misdirected to a hostile party, the hostile party may not gain access to a user's online services. In other words, the validation token provides an additional layer of security to the authentication ticket and allows the online service provider to check that the user agent presenting the authentication ticket is indeed associated with the user who presented the identification and authentication information. For example, where a user presents an online service provider with a username and password and the online service provider requests authentication to provide access to the user, but where the authentication ticket is misdirected, the validation token will allow the online service provider to recognize the misdirection and prevent access.

In embodiments, the validation token may be an IP address associated with the client computing device used by the user. For instance, where the user attempts to access email, the user will be accessing the Internet and have an associated IP address. In embodiments, the authentication server, such as authentication server 404, may place the IP address associated with the user into a field of the authentication ticket. When receiving authentication tickets, in addition to validating that access is authenticated, the online service provider may check the ticket for an IP address field and verify that the IP address field matches the IP address of the client requesting access to an online service. Thus, where an authentication ticket is misdirected to a hostile party, the hostile party would be unable (assuming it does not have the IP address of the user's client computing device) to utilize the ticket to gain access to the user's online services because the online service provider will recognize that the IP addresses do not match and will reject access. Therefore, by using an validation token such as an IP address, system 400 ensures that a connection between a user and an online service provider is authenticated.

In various other embodiments, the validation token may be the return URL address associated with a target. As previously discussed, an authentication server, such as authentication server 404, sends an authentication ticket to a target confirming authentication. Typically, the target will be the same as the online service provider that the user is seeking access to. At times, however, due to hacking or inadvertence, the target may mistakenly differ from the online service provider and the authentication server will send the authentication ticket to the wrong party, potentially a hostile party. The target has an associated URL address, also known as a return URL address. The return URL address informs the authentication server where to send the authentication ticket (e.g., the location of the target). In these embodiments, where the return URL address is included within the authentication ticket, the online service provider will check the return URL address of a presented authentication ticket and reject the ticket where the return URL address does not match the URL address of the online service provider. For example, assuming a user is attempting to access "www.hotmail.com." The user accesses the website, enters an email address and a password, and the online service provider requests authentication for the user. Where the authentication ticket is mistakenly sent to target "www.mailhot.com" (or anything other than the online service provider's address), the authentication ticket will have a reference to the mistaken target. Thus, where a hostile party associated with the mistaken target attempts to use the ticket to access the user's email, the online service provider (here hotmail) will reject the authentication ticket and deny access because the authentication ticket will have the address "www.mailhot.com," and that will not match the online service provider's address of "www.hotmail.com." As will be understood and appreciated by those having ordinary skill in the art, certain optimizations may be used to minimize the additional amount of data included in the ticket, thus enhancing performance. For instance, in embodiments, instead of embedding the URL, a cryptographic hash of the URL may be used.

In yet other various embodiments, encryption of the return URL may be used to ensure authorized access where there are multiple legitimate relying sites. In these embodiments, the ticket is encrypted using a hash of the return URL is included as an initialization vector. Thus, using the above example, the initialization vector would include a hash of "www.hotmail.com" during legitimate use, but may include a hash of some other return URL where a malicious party is attempting to obtain the ticket and use it to gain access to the legitimate relying sites. Here, assuming that the return URL hashed and included in the initialization vector is for "www.live.com/hotmail," the receiving site will use the request URL to compute an initialization vector for decrypting the ticket. If the request URL and the return URL match, the ticket will pass signature validation and will be accepted. But if the request URL and the return URL differ, the ticket will be rejected by the online service provider. Thus, ensures that where a hostile party obtains a ticket by using an artificial return URL, the ticket is useless to the hostile party because, when decrypted, the ticket will be rejected by the online service provider. Because there are multiple legitimate relying sites in these examples, however, the ticket may be used more than once. To account for this, in embodiments, the first relying site will re-encrypt the ticket using a hash of the generic name for the group of sites (e.g. www.live.com) instead of the full return URL as an initialization vector. Thus, subsequent legitimate relying sites having the same domain name system will allow the ticket to be used, where it is valid, by decrypting the ticket with the generic name as an initialization vector. Therefore, the ticket could be used by a legitimate user to access "www.live.com/money" or some other site within the domain name system. But again, where a hostile party obtained the ticket using an artificial return URL, the ticket will be rejected.

It will be understood and appreciated by those of ordinary skill in the art that additional components not shown may also be included within any of system 400, database 402, and authentication server 404.

Figure 5:
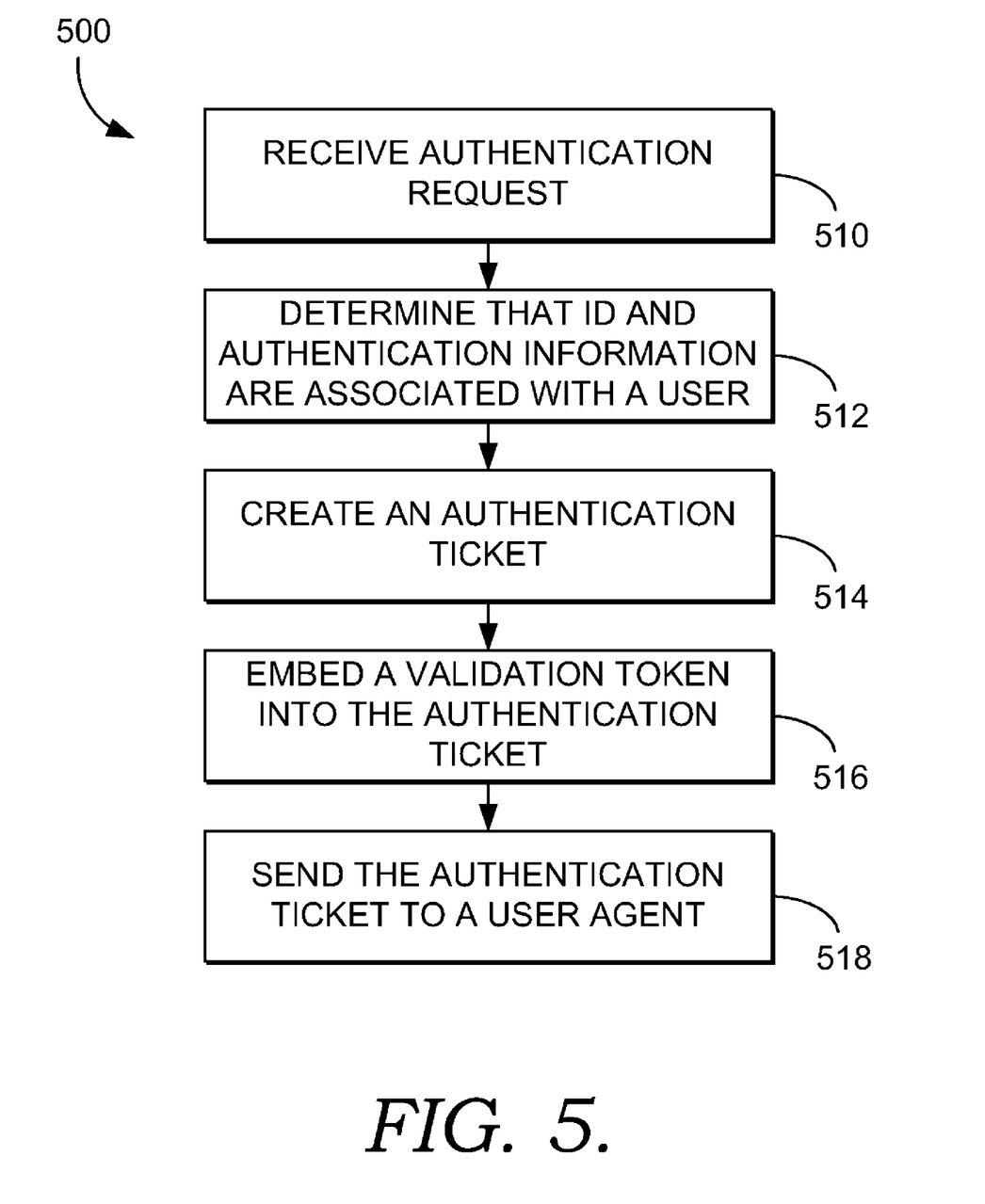
FIG. 5 is a flow diagram illustrating an exemplary method for authentication ticket validation, in accordance with an embodiment of the present invention.

Turning now to FIG. 5, a flow diagram of an exemplary method for authentication ticket validation, in accordance with an embodiment of the present invention, is illustrated and designated generally as reference numeral 500. Initially, as indicated at block 510, an authentication request is received, e.g., by receiving component 406 of FIG. 4. For instance, where a user seeks to access one or more online services using a client computer and a user agent, such as a web browser, an authentication request may be generated by the online service provider once the user has entered a set of identification information and a set of authentication information. In other words, the online service provider may send a request to authenticate that the information entered by the user is accurate and that it matches an account in an online service. As previously stated, the identification information and the authentication information entered by the user may be a username and a password. But, embodiments of the present invention are not limited to just a username and password and, as previously discussed, other types of identification and authentication information may be submitted by the user when the user requests access to an online service.

Next, as indicated at block 512, it is determined that the identification and authentication information are associated with a user. For instance, where the username and password are associated and where the username corresponds with an account in the online service, it will be determined that the identification information and authentication information are associated with a user for that online service. In other words, this step is the initial authentication step that authenticates that the user requesting access to the online service has information authenticating access. Next, as indicated at block 514, an authentication ticket is created. As previously discussed, the authentication ticket, in various embodiments, may include information indicating to the online service provider that the user is authentication to access one or more services provided by the online service provider.

Next, as indicated at block 516, a validation token is embedded into the authentication ticket. The validation token verifies that communication between an online service provider and a user is authenticated. In embodiments, the validation token may include information verifying that the authentication ticket was sent to an appropriate target. For instance, the validation token may include a return URL address of the target an authentication server sent the authentication ticket to. Also, in embodiments, the validation token may include information verifying that an appropriate client is attempting to gain access to the online services. For instance, the validation token may include an IP address of the client initially requesting access to the online service. Thus, where a computer other than the client attempts to gain access to the online service using a misguided authentication ticket, access may be denied because the online service provider may recognize that the IP address of the computer presenting the authentication ticket is different from the IP address of the client initially requesting access (as included in the validation token).

Next, as indicated at block 518, the authentication ticket is sent to a user agent. As previously discussed, the authentication ticket is sent to a user agent that forwards the ticket to a target. In typical operation, the target may be the online service provider that the user or the user agent is attempting to gain access to. Sometimes, however, the target may mistakenly be an address different from the online service provider. In those instances, where the authentication ticket is mistakenly forwarded by the user agent to a hostile party, the validation token included in the authentication ticket will block the hostile party from gaining access to the user's online service account, as previously discussed.

In each of the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the methods, computer-readable media, and systems. It will be understood that certain features and sub-combinations are of utility and may be employed without reference to other features and sub-combinations. This is contemplated by and within the scope of the claims.

The invention claimed is:

1. One or more nonvolatile computer-storage media having computer-usable instructions embodied thereon for performing a method of validating an authentication ticket to ensure authenticated communications between a client and an online service provider, the method comprising:
    at an authentication server, receiving an authentication request from a user agent associated with the client, wherein the authentication request is a request to access a service provided by the online service provider, the authentication request including a set of identification information and a set of authentication information;
    determining that the set of identification information and the set of authentication information are associated with a user;
    creating the authentication ticket including a user identification and an authentication, wherein the authentication ticket indicates to the online service provider that the user is authenticated to access one or more services provided by the online service provider;
    at the authentication server, embedding a validation token into the authentication ticket, the validation token providing enhanced verification that the access provided by the online service provider to the one or more services is authenticated, wherein the validation token is an IP address associated with the client; and
    encrypting the authentication ticket using a hash of a URL of the online service provider as an initialization vector.

2. The nonvolatile computer-storage media of claim 1, wherein the method further comprises sending the authentication ticket to the user agent, and wherein the user agent utilizes the authentication ticket to allow the user to gain access to the one or more services.

3. The nonvolatile computer-storage media of claim 1, wherein the online service provider ensures an authenticated connection with the client, granting access to one or more online services where the online service provider determines that the IP address from the validation token matches an IP address associated with the client seeking access to the one or more online services.

4. The nonvolatile computer-storage media of claim 3, wherein the set of identification information is a username and wherein the set of authentication information is a password.

5. The nonvolatile computer-storage media of claim 4, wherein the user agent is a web browser.

6. The nonvolatile computer-storage media of claim 1, wherein the online service provider rejects access to one or more online services by the client where it determines that the IP address from the validation token does not match an IP address associated with the client seeking access to the one or more online services.

7. The nonvolatile computer-storage media of claim 6, wherein the set of identification information is a username and wherein the set of authentication information is a password.

8. The nonvolatile computer-storage media of claim 7, wherein the user agent is a web browser.

9. A system for validating an authentication ticket to ensure authenticated communications between a client and an online service provider, the system comprising:
- a computing device associated with one or more processors and one or more computer-storage media;
- a data store coupled with the computing device, wherein the data store includes a database;
- a receiving component configured to receive an authentication request from a user agent associated with the client, the authentication request including a set of identification information and a set of authentication information;
- a determining component configured to determine that the set of identification information and the set of authentication information are associated with a user;
- a creating component configured to create the authentication ticket including a user identification and an authentication, wherein the authentication ticket indicates to the online service provider that the user is authenticated to access one or more services provided by the online service provider;
- an embedding component configured to embed a validation token into the authentication ticket, the validation token providing enhanced verification that the access provided by the online service provider to the one or more services is authenticated, wherein the validation token is an IP address associated with the client, wherein the authentication ticket is encrypted using a hash of a URL of the online service provider as an initialization vector; and
- the database for storing information associated with validating the authentication ticket.

10. The computerized system of claim 9, wherein the online service provider ensures an authenticated connection with the client, granting access to one or more online services where the online service provider determines that the IP address from the validation token matches an IP address associated with the client seeking access to the one or more online services.

11. The computerized system of claim 9, wherein the online service provider rejects access to one or more online services by the client where it determines that the IP address from the validation token does not match an IP address associated with the client seeking access to the one or more online services.

12. A method for validating an authentication ticket to ensure authenticated communications between a client and an online service provider, comprising:
- receiving an authentication request from a user agent associated with the client, the authentication request including a set of identification information and a set of authentication information, wherein the authentication request is a request to access a service provided by the online service provider;
- determining that the set of identification information and the set of authentication information are associated with a user;
- creating the authentication ticket including a user identification and an authentication, indicating to the online service provider that the user is authenticated to access one or more services provided by the online service provider;
- embedding a validation token into the authentication ticket, the validation token providing enhanced verification that the access provided by the online service provider to the one or more services is authenticated, wherein the validation token is an IP address associated with the client or a return URL associated with the online service provider; and
- sending the authentication ticket to the user agent, wherein an authentic connection with the client is ensured by
  - (A) a match between the IP address from the validation token and an IP address associated with the client seeking access to the one or more online services, or
  - (B) a match between the return URL from the validation token and the return URL associated with the online service provider; and
- wherein prior to sending the authentication ticket to the user agent, the authentication ticket is encrypted using a hash of the return URL as an initialization vector.

* * * * *